United States Patent Office 3,610,052
Patented Oct. 5, 1971

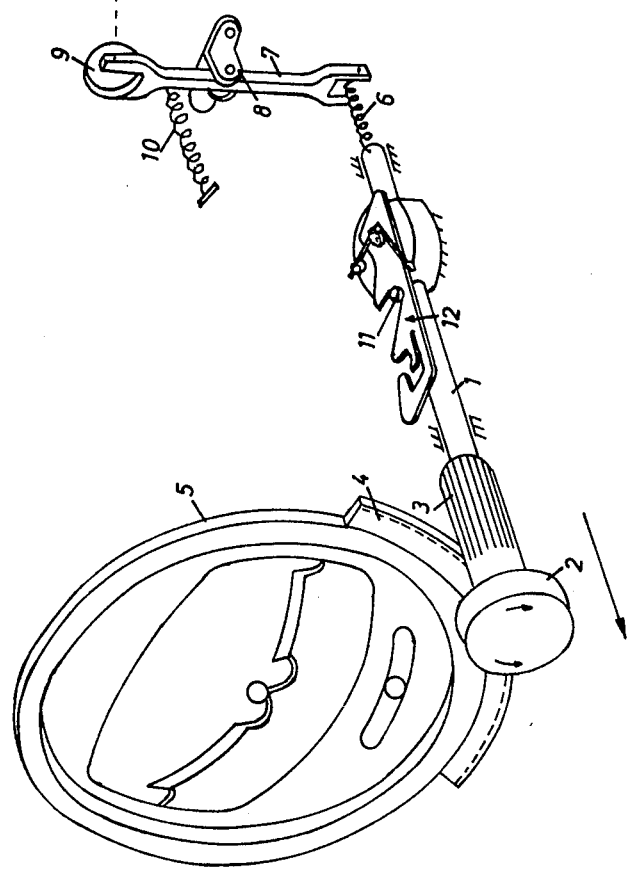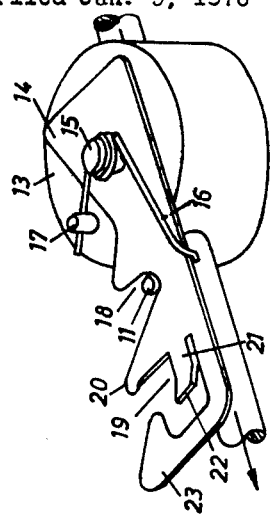

3,610,052
DEVICE FOR LOCKING THE GIMBAL SYSTEM OF GYROSCOPE ASSEMBLIES
Bernhard Strittmatter, Nussdorf (Bodensee), and Werner Hantusch, Uberlingen (Bodensee), Germany, assignors to Bodenseewerk Geratetechik G.m.b.H., Uberlingen (Bodensee), Germany
Filed Jan. 9, 1970, Ser. No. 1,809
Claims priority, application Germany, Jan. 14, 1969, P 19 01 572.6
Int. Cl. G01c *19/26*
U.S. Cl. 74—5.1
6 Claims

ABSTRACT OF THE DISCLOSURE

In one longitudinal position of a drawbar, a locking mechanism restrains the gimbal system, with the gimbal system being free in a second longitudinal position. A click-stop device is used to hold the drawbar alternatively in the two positions. This device comprises a pivoted plate having two indentations extending from one edge, which indentations are joined by a tapered edge. These indentations are spaced from each other along the line of movement of the drawbar. A spring resiliently urges the plate in the direction at which said edge is forwardly. A pin on the drawbar bears against the one edge and when seated in one indentation holds the drawbar in one position and when seated in the other indentation holds the drawbar in the second position. When the drawbar is pulled once the pin moves along the tapered edge, pivoting the plate, to transfer from one indentation to the second. When the drawbar is pulled a second time, a pin release on the plate disengages the pin from the plate so that the pin is free to return to said one indentation from the second.

BACKGROUND AND SUMMARY OF THE INVENTION

The present invention relates to a device for locking the gimbal system of gyro assemblies, for instance of an artificial horizon, by means of a locking member which is engageable by the axial movement of a transmission rod to axially fix the rod in the locked position.

In almost all gyro assemblies and primarily with gyro horizons it is desired that the gimbal system shall be released only for the operation and that it be locked, i.e. blocked, during the remaining time. In most types locking is effected by means of a pull knob on the front face of the assembly which knob can be manually actuated. The pull movement is transmitted through a drawbar, lever and cam to the gimbal system in such a manner that the gimbal system is blocked in the end position of the drawbar. The pull knob itself must be maintained in this end position for the duration of the blocking.

Generally, this drawbar is used not only to actuate the lock but is additionally used in many cases to adjust some scales and aircraft symbols, respectively. This adjustment of the scales and aircraft symbols, respectively, is effected almost exclusively by a rotary movement of the pull knob.

In a prior art system locking is effected by the insertion of a clamp in a groove of the drawbar after the knob has been pulled, whereby the pull knob is prevented from sliding back. This arrangement suffers from the disadvantage that the clamp is a loose separate part which is easy to lose. Moreover, it is difficult for the human pilot to insert this clamp particularly since human pilots wear gloves during flight almost exclusively.

With another prior art solution the pull knob is, in the end position, fixed against sliding back by a rotation into a locked position. The rotation of the pull knob has the undesired disadvantage that the scale and aircraft symbol, respectively, will also be adjusted and, that is, to always the same position from which it cannot be further changed as long as the gimbal system is locked. Adjustment of the scale and aircraft symbol, respectively, can only be carried out when the pull knob is in a released state. After releasing the lock, the scale and aircraft symbol, respectively, must each time be readjusted.

It is an object of the present invention to avoid the described disadvantages of the prior art locking devices.

According to the invention this object is attained by using a click-stop mechanism to achieve the axial fixation of the transmission rod, which mechanism can be shifted between first and second stable locking positions by means of successive equidirectional axial movements of the transmission rod, the gimbal system being locked in the first locking position and being released in the second locking position.

Change-over is advantageously releasable by pull movements of the transmission rod.

With the invention click-stop mechanisms are used as are known per se, for instance, in ball point pens. By a first pull movement (or maybe push movement) fixing of the transmission rod in a first locking position is attained. In this position, the gimbal system is locked by the locking member. Upon a second pull movement fixation of the transmission rod in a second locking position and release of the gimbal system by the locking member is attained. By a third pull movement the gimbal system is locked again, and so on. For this locking and unlocking of the gimbal system, neither a rotation of the transmission rod is required nor are specific loose locking members necessary.

This makes the invention particularly suited for those cases in which a rotatable setting knob is mounted to the transmission rod through which, by rotation, an adjustment, for instance, of an aircraft symbol with an artificial horizon can be carried out at the same time.

In the disclosed embodiment, the click-stop mechanism has a plate supported for pivotal movement against a spring force, stationary with respect to a housing. This plate has two indentations joined by a tapered edge. A transverse pin attached to the transmission rod engages in said indentations under the influence of said spring force. A tongue forming a part of the plate and bent out of the plane of the plate, in a direction of pull, internally projects into the indentation disposed in a direction of pull.

In the one locking position the transverse pin is disposed in the rear indentation. During a pull movement of the transmission rod the transverse pin slides along the tapered edge, the plate evading resiliently, until it drops into the second, front indentation and engages laterally at said tongue. During a next axial pull movement of the transmission rod the transverse pin slides along the tongue until it reaches the end of the tongue, and the spring force pivots the plate such that the transverse pin comes to lie in front of the forward face of the tongue. Now, when the transmission rod is released, spring means pulls it back. Via the chamfered surface provided by the outward bending of the tongue, the transverse pin forces the plate upwardly and away so that the transverse pin again comes to engage in the first indentation.

DESCRIPTION OF THE DRAWINGS

FIG. 1 is a perspective illustration of a locking device of the invention for an artificial horizon; and FIG. 2 is an enlarged illustration of a detail.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Reference numeral 1 designates a drawbar or rod which is guided for axial movement in an apparatus housing. The drawbar carries a knob 2 forming a handle. Drawbar 1 also is rotatable and carries an elongated gear wheel 3. By the knob 2 the drawbar can be drawn forwardly axially in a direction of the arrow, on the other hand a mask 5 including an aircraft symbol can be rotated via a gear segment 4 which engages gear wheel 3.

Through a spring 6 the drawbar 1 acts on a lever 7 pivoted as at 8 and carrying a roller 9. The roller 9 constitutes a part of a locking mechanism by means of which the gimbal system of an artificial horizon is lockable. The lever 7 is under the influence of a tension spring 10 which keeps the locking member 9 in the unlocked position and releases the gimbal system.

The drawbar 1 has a transverse pin 11. This transverse pin 11 forms a part of a click-stop mechanism generally referenced 12 and shown in detail in FIG. 2.

A plate 14 is supported on a pin 15 for pivotal movement on a base body 13 stationary with respect to the housing. The plate 14 is under the influence of a torsion spring 16 which bears against a pin 17 of the base body 13. Spring 16 urges plate 14 about the pin 15 in a clockwise direction. The plate 14 has two indentations 18 and 19 joined by a tapered edge 20. A tongue 21 projects internally into the front indentation 19 in the direction of pull. This tongue is bent upwardly at its distal end as at 22, thereby constituting a chamfered surface. In the direction of pull, the indentation 19 is defined by a lug 23.

In the illustrated first locking position of the drawbar 1, the transverse pin 11 on the drawbar engages in the indentation 18. Under the influence of the spring 10, the roller 9 is in the attitude at which the locking mechanism is ineffective and the gimbal system is released. Upon the knob 2 being thereafter pulled, the drawbar 1 is moved forwardly. This causes the transverse pin 11 to slide along the tapered edge 20 of the plate 14, the plate 14 moving in a counterclockwise direction against the urging of the spring 16. Finally, the transverse pin 11 drops into the second indentation 19. This allows the plate 14 to pivot in a clockwise direction under the influence of the spring 16 until the pin 11 comes to rest at the lateral edge of the tongue 21. This is the second locking position of the drawbar 1. At this second locking position the pull of the drawbar on spring 6 is sufficient to overcome the force of spring 10 so that roller 9 moves to the right in FIG. 1, causing the locking mechanism to restrain the gimbal system.

In order to again release the gimbal system and to return the drawbar 1 into the indicated first locking position thereof, the knob 2 must be pulled forwardly a second time. When this is done, the transverse pin 11 slides along the lateral edge of the tongue 21 (forming a pin release means) until it slips off the distal end of the tongue. The plate 14 is free to pivot in a clockwise direction so that the pin comes to lie underneath the chamfered tongue 21. The forward movement of the pin 11 (and drawbar 1) is limited by the lug 23. When the knob 2 is now released, the drawbar 1 will be drawn back by the springs 10 and 6. Then, the transverse pin 11 passes underneath the chamfered end 22 of the tongue 21 and forces the plate 14 upwardly, so that the pin moves rearwardly below the plate 14 and finally drops into the indentation 18. Thus, after pulling the knob 2 twice, the drawbar has again assumed the indicated initial position. As described, the gimbal system now is released.

We claim:

1. In an apparatus comprising a locking mechanism for the gimbal system of a gyro, and a device having a movable member which is movable axially in a body member to cause the mechanism to assume a lock attitude or to assume an unlocked attitude for the gimbal system, the improvement wherein said device includes:

click-stop means operatively interconnecting the members and having two stable positions between which it is moved by successive axial movements of the movable member in the same direction, the first movement of the movable member in said direction causing the means to move from one position to the other and the second movement of the movable member in said direction and release of the movable member causing the means to move from said other to said one position, said means comprising a pin attached to one of the members and a cam part attached to the other of the members and engaging said pin, said cam part defining two stable positions thereon for said pin, said device being connected to said mechanism so that in said one position of the means said mechanism is caused to assume the locked attitude and in said other position of the means said mechanism is caused to assume the unlocked attitude.

2. In an apparatus as set forth in claim 1, wherein said movable member has a handle and movement in said direction is effected by pulling on said handle.

3. In an apparatus as set forth in claim 2, wherein said device includes a spring operatively associated with said movable member to resiliently urge said movable member in the reverse of said direction.

4. In an apparatus as set forth in claim 3 having a rotatable auxiliary unit, wherein said movable member is rotatable, and said apparatus includes means rotatably connecting said movable member and said unit.

5. In an apparatus as set forth in claim 1, wherein
said cam part comprises a plate pivotally mounted about a fixed axis, said plate having two indentations extending inwardly from one edge of the plate and joined by a tapered edge, said indentations being spaced from each other axially along said member, spring means operatively associated with said plate to urge said plate in the pivotal direction such that said one edge leads the remainder of the plate, and pin disconnect means on said plate in association with one of said indentations; and said pin projecting outwardly from said movable member along said one edge of the plate for engaging said plate in said indentations.

6. In an apparatus as set forth in claim 5, wherein said pin disconnect means comprises a tongue associated with one of said indentations and having its distal end extending in said direction, said distal end being bent away from said movable member so that the pin will move under said distal end and thereafter under the plate to return to the other indentation.

References Cited

UNITED STATES PATENTS

| | | | |
|---|---|---|---|
| 2,366,721 | 1/1945 | Gabrielson | 74—5.1 |
| 2,419,928 | 4/1947 | Wiggin et al. | 74—5.1 X |
| 2,808,726 | 10/1957 | Chombard | 74—5.1 |
| 2,846,886 | 8/1958 | Seifried | 74—5.1 |
| 2,867,122 | 1/1959 | Hurlburt | 74—5.1 |
| 3,186,241 | 6/1965 | Blanding et al. | 74—5.12 |
| 3,508,447 | 4/1970 | Shirley | 74—5.1 |

FOREIGN PATENTS

| | | | |
|---|---|---|---|
| 701,385 | 12/1953 | Great Britain | 74—5.1 |

MANUEL A. ANTONAKAS, Primary Examiner

U.S. Cl. X.R.

74—527